Dec. 6, 1932.   A. C. DOBRICK   1,889,778
COMPRESSION COUPLING
Filed Nov. 5, 1928
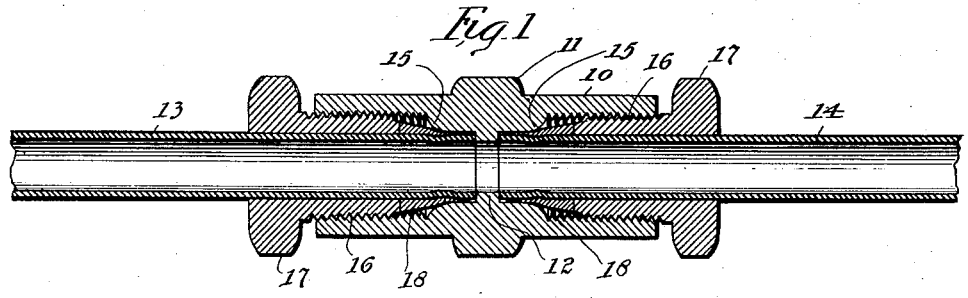
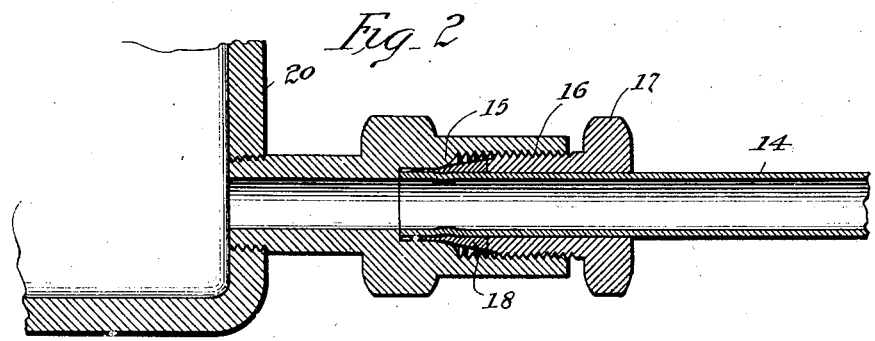
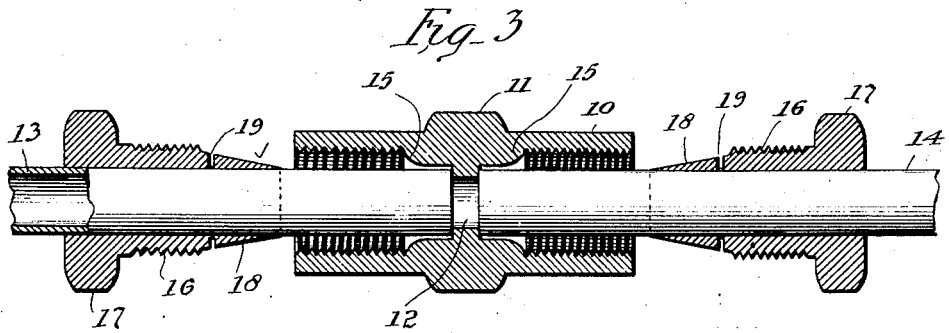
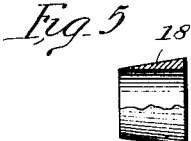
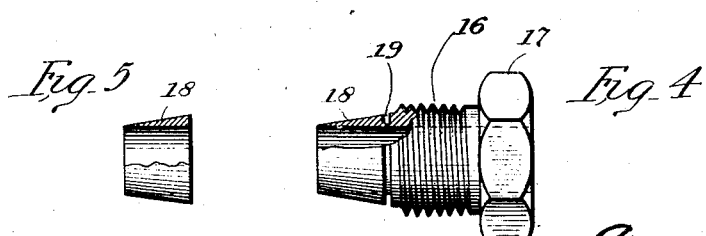
INVENTOR:
August C. Dobrick
BY John Howard McElroy
his ATTORNEY.

Patented Dec. 6, 1932

1,889,778

UNITED STATES PATENT OFFICE

AUGUST C. DOBRICK, OF CHICAGO, ILLINOIS

COMPRESSION COUPLING

Application filed November 5, 1928. Serial No. 317,368.

My invention is concerned with compression couplings of the type in which an interiorly-threaded female member has a distorting shoulder beyond the thread, against which shoulder the tapered end of the exteriorly-threaded male member is forced as it is screwed in place, to compress, as it were, said tapered end into, or into engagement with, the pipe passing through the male member and into the female member to which it is coupled.

I have found that the final turning of the tapered end on the tube tends to crystallize or otherwise affect the tube so that it breaks off in use within said tapered end much sooner than it should, and I remedy this defect in my improved coupling by forming a deep annular groove in the male member between the tapered end and the adjacent end of the threaded portion, so that the tapered end is nearly severed from the rest of the male member. When the male member is screwed in, and its tapered end begins to be compressed into the tube by its contact with the distorting shoulder, the resistance offered to the continued rotation of the tapered end is sufficient to break the very thin annular web of metal connecting said tapered end with the body of said male member, with the result that the tapered end ceases to rotate, but is forced inward against the tube by a direct longitudinal thrust produced by the continued rotation of the body of the male member. Tests have demonstrated that a tube thus coupled is more durable than the old style, due presumably to there being less crystallization of the material of the tube than occurred with the old form. Moreover, it produces a joint than can be very readily removed, if desired, since the threaded portion of the male member is not in any way jammed on the tube, although the detached tapered end is permanently secured thereon, but this does not prevent the tube being easily withdrawn from the coupling when the male member is screwed out, and re-inserted, if necessary or advisable.

To illustrate my invention, I annex hereto a sheet of drawings, in which the same reference characters designate identical parts in all the figures, of which,—

Fig. 1 is a central longitudinal section showing my coupling in use to connect two pipes end to end;

Fig. 2 is a similar view, showing my coupling used to connect a pipe to a reservoir;

Fig. 3 is a view similar to Fig. 1, but showing the parts before the male members have been screwed into place;

Fig. 4 is a side elevation of one of the male members, partly broken away, in central vertical section; and Fig. 5 is a similar view of the tapered end after it has been detached.

Where the female member is designed to couple two pipes end to end, as seen in Fig. 1, it consists of the cylindrical body portion 10, preferably having the flange 11 at its center, hexagonal in cross section, so that a wrench can be applied thereto. The bore therethrough at the center has what may be called an annular flange 12 projecting thereinto and forming the stop for the ends of the tubes 13 and 14 to be connected, these tubes abutting against the shoulders formed by the flange, and the diameter of the aperture 12 being preferably not less than the internal diameter of the tubes. On either side are the annular distorting shoulders 15, which are of the proper design so that when the tapered end of the male member is forced against such shoulder as it is screwed in place, the metal will be slightly distorted and forced inward so as to engage and slightly compress the soft metal of the tube, as indicated in Figs. 1 and 2. From the shoulders 15 outwardly to the ends, the female member is internally threaded to co-operate with the external threads 16 of the male member, which preferably has the hexagonal flange 17 on its end to which a wrench may be applied. Instead of the tapered end 18 increasing in diameter steadily until it merges into the threaded portion 16, as in the old construction, I cut or otherwise form therein, near said threaded portion, the annular channel 19, preferably with its walls parallel and extending nearly through the metal, so that the tapered end is connected to the body portion of the male member by a very thin annular web, which breaks as soon as the action of the tapered end 18 on the distorting shoulder 15 creates enough friction to offer any serious obstacle to the continued rotation of said tapered end 18. After it breaks, the continued turning of the male member brings the parallel walls of the now bottomless channel 19 together, and the resistance to the rotation of said tapered end being greater than the friction between the vertical walls, the continued rotation of the male member simply forces the tapered end in as far as it will go without any further rotation thereof.

Where my invention is applied to connect a pipe 14 to a tank 20, as seen in Fig. 2, the female member is modified as shown, having the reduced end threaded as seen, so as to be screwed into the threaded aperture in the tank.

What I claim as new, and desire to secure by Letters Patent of the United States, is:

1. As a new and useful article of manufacture, a two-part pipe coupling comprising an internally threaded integral female member provided with an internal annular distorting shoulder, and an integral externally threaded male member adapted to be screwed therein, and provided with an acutely tapered end adapted to co-operate with said shoulder to be forced thereby into intimate contact with the pipe to be coupled, said tapered end being connected with the body portion by a thin portion that breaks off when the distortion begins so that said tapered end is not compelled to rotate on the pipe while the distortion is being completed.

2. As a new and useful article of manufacture, a two-part pipe coupling comprising an internally threaded integral female member provided with an internal annular distorting shoulder, and an integral externally threaded male member adapted to be screwed therein, and provided with an acutely tapered end adapted to co-operate with said shoulder to be forced thereby into intimate contact with the pipe to be coupled, said tapered end being separated from the body portion by a deep annular groove which leaves only a thin annular connection that breaks off when the distortion beings so that said tapered end is not compelled to rotate on the pipe while the distortion is being completed.

3. As a new and useful article of manufacture, a two-part pipe coupling comprising an internally-threaded integral female member provided with an internal annular distorting shoulder whose operative surface is convex in cross section, and an integral externally-threaded male member adapted to be screwed therein, and provided with an acutely-tapered end adapted to co-operate with said shoulder to be forced thereby into intimate contact with the pipe to be coupled, said tapered end being connected with the body portion by a thin portion that breaks off when the distortion begins so that said tapered end is not compelled to rotate on the pipe while the distortion is being completed.

4. As a new and useful article of manufacture, a two-part pipe coupling comprising an internally-threaded integral female member provided with an internal annular distorting shoulder whose operative surface is convex in cross section, and an integral externally-threaded male member adapted to be screwed therein, and provided with an acutely-tapered end adapted to co-operate with said shoulder to be forced thereby into intimate contact with the pipe to be coupled, said tapered end being connected with the body portion by a deep annular groove which leaves only a thin annular connection that breaks off when the distortion begins so that said tapered end is not compelled to rotate on the pipe while the distortion is being completed.

5. As a new and useful article of manufacture, a male pipe-coupling member having three portions, one to which a wrench can be applied; another a threaded portion; and finally an acutely tapered portion adapted to be deformed when applied to a pipe and connected to the threaded portion by a thinned web portion adapted to be broken during said application, substantially as and for the purpose described.

6. As a new and useful article of manufacture, a male pipe-coupling member having three portions; one to which a wrench can be applied; another a threaded portion; and finally an acutely tapered portion adapted to be deformed when applied to a pipe and connected to the threaded portion by a fragile portion adapted to be broken during said application, substantially as and for the purpose described.

7. The method of coupling two cylindrical members which consists in forming one member with a threaded recess having a tapered inner end to receive the other member, then applying a thinly connected double sleeve unit to the cylindrical member, the rear part of said unit being threaded and its front part being compressible, then forcing said unit into the recess until the connection between its front and rear parts is broken, and then forcing the compressible part of the unit as a separate piece into the tapering end of the recess, by screwing the threaded part of the unit further into the recess, for the purpose specified.

8. The method of connecting a soft metal cylindrical member to a fitting having a threaded recess to receive the other member, said recess having a tapering inner end, which consists in applying to said cylindrical member a compression sleeve and a nut connected by a thin wall, then screwing the nut into the fitting to force the compression sleeve into said recess to break the thin wall between the sleeve and the nut, and thereafter screwing the nut further into the fitting to force the sleeve as a separate piece into the tapering portion of the recess of the fitting, for the purpose specified.

In witness whereof, I have hereunto set my hand this 31st day of October, 1928.

AUGUST C. DOBRICK.